United States Patent [19]

Cassidy et al.

[11] Patent Number: 4,902,769
[45] Date of Patent: Feb. 20, 1990

[54] LOW DIELECTRIC FLUORINATED POLY(PHENYLENE ETHER KETONE) FILM AND COATING

[75] Inventors: Patrick E. Cassidy, Austin; Gordon L. Tullos, Lake Jackson, both of Tex.; Anne K. St. Clair, Poquoson, Va.

[73] Assignee: The United States of America as represented by the Administrator of the National Aeronautics and Space Administration, Washington, D.C.

[21] Appl. No.: 248,009

[22] Filed: Sep. 23, 1988

[51] Int. Cl.[4] .................. C08G 8/02; C08G 14/00
[52] U.S. Cl. .................. 528/125; 528/126; 528/128; 528/219; 528/220
[58] Field of Search ........... 528/125, 126, 128, 219, 528/220

[56] References Cited

U.S. PATENT DOCUMENTS 3,442,857  5/1969  Thornton ..................... 528/176

Primary Examiner—John Kight
Assistant Examiner—M. L. Moore
Attorney, Agent, or Firm—George F. Helfrich; John R. Manning; Charles E. B. Glenn

[57] ABSTRACT

A fluorinated poly(phenylene ether ketone) having one of the following structural formulas

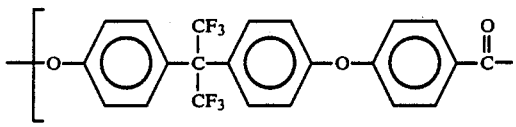

-continued

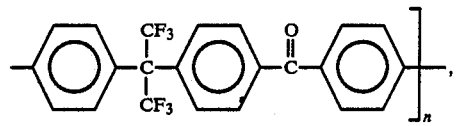

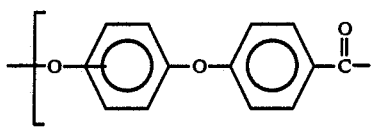

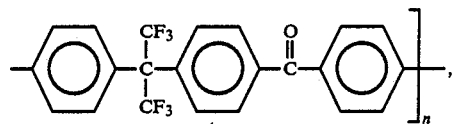

or

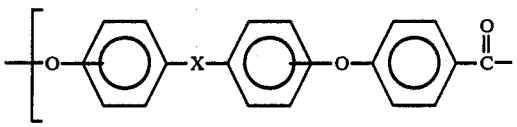

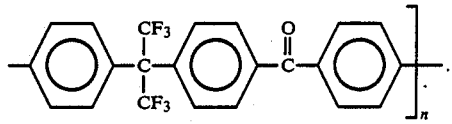

wherein X is selected from the group consisting of aryl, $SO_2$, O, CO, $-C(CH_3)_2$, and S, is prepared by reacting a bisphenol with 1,1,1,3,3,3-hexafluoro-2,2-bis[4-(4-halobenzoyl)phenyl]propane (wherein halo is fluoro or chloro), which is a novel monomer formed as the reaction product of halobenzene (wherein halo is fluoro or chloro) and 1,1,1,3,3,3-hexafluoro-2,2-bis(p-chloroformylphenyl)propane.

9 Claims, No Drawings

LOW DIELECTRIC FLUORINATED POLY(PHENYLENE ETHER KETONE) FILM AND COATING

ORIGIN OF THE INVENTION

The invention described herein was jointly made in the performance of work under a NASA Grant and by an employee of the United States Government. In accordance with 35 USC 202, the grantee elected not to retain title.

BACKGROUND OF THE INVENTION

1. Field of the Invention

The present invention relates generally to fluorinated poly(phenylene ether ketone). It relates particularly to a highly optically transparent, low dielectric fluorinated poly(phenylene ether ketone), and especially to films or coatings thereof. Both the precursor and the polymer itself are novel compositions of matter.

2. Prior Art

As a class, poly(phenylene ether ketones) are thermoplastic matrix resins which are being considered for fiber-reinforced composite applications. However, these polymer systems have been difficult to produce in high molecular weight form, as has been the case for PEEK ®, a commercial poly(phenylene ether ether ketone) marked by ICI. (See J. P. Critchley et al, *Heat Resistant Polymers,* Plenum Press, New York, p. 173).

Poly(phenylene ether ketones) have not been materials of choice of thin film applications. They are by nature insoluble and cannot be solution cast into polymer films. The only known film form of the commercial product PEEK ® must be extruded. The extruded film is difficult to produce and is pale to dark amber in color, depending on thickness.

State-of-the-art polymer film and coating materials used as passivant insulators and interlevel dielectrics in the area of microelectronics range in dielectric constant from approximately 3.2 to 4.0, depending upon frequency and moisture content. Although the dielectric constant of commercial poly(phenylene ether ketone) is attractively low (2.8-2.9 at 10 GHz), it has not been useful in the field of electronics because of its inability to be processed.

State-of-the-art optically transparent polymer film and coating materials used in thermal control coating systems and for other space applications have been traditionally the aromatic polyesters (such as Mylar ®) or fluorinated hydrocarbons (such as FEP-Teflon ®). Poly(phenylene ether ketones) have not been exploited for thin film applications in space because of their inability to be processed in the form of thin film materials and because they are not optically transparent enough to be effective at the required solar wavelength (500 nm).

Accordingly, it is a primary object of the present invention to provide a low dielectric fluorinated poly(phenylene ether ketone) film and coating material.

Another primary object of the present invention is to provide a highly optically transparent, fluorinated poly(phenylene ether ketone) film and coating material.

Another object of the present invention is to provide a processable, soluble fluorinated poly(phenylene ether ketone) film and coating material.

Another object of the present invention is to provide a highly thermally stable fluorinated poly(phenylene ether ketone) film coating material.

Another object of the present invention is to provide a fluorinated low dielectric poly(phenylene ether ketone) film and coating material having a dielectric constant near 2.4 which should find special utility in electronic applications where high electrical insulation and thermal stability are required.

Another object of the present invention is to provide a highly optically transparent fluorinated poly(phenylene ether ketone) film and coating material having high transparency at wavelengths in the visible region of the electromagnetic spectrum, such material being useful for transmitting solar energy as needed in such applications as transmitting solar energy as needed in such applications as solar cell covers or second surface mirror coatings in thermal control coating systems.

SUMMARY OF THE INVENTION

According to the present invention the foregoing objects are achieved by the provision of a fluorinated poly(phenylene ether ketone) having the following structural formula:

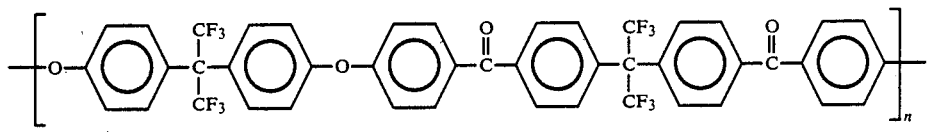

This polymer, which is denominated 12F-PEK, is prepared by reacting bisphenol AF, which is

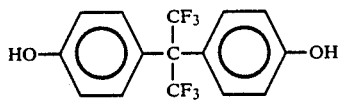

with 1,1,1,3,3,3,-hexafluoro-2,2-bis[4-(4-halobenzoyl)-phenyl] propane, which is

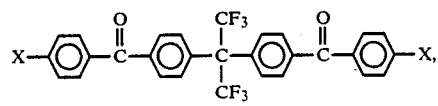

wherein X is F or Cl.

The 1,1,1,3,3,3-hexafluoro-2,2-bis[4-(4-halobenzoyl)-phenyl] propane is a novel monomer, which is formed as the reaction product of halobenzene and 1,1,1,3,3,3-hexafluoro-2,2-bis(p-chloroformylphenyl) propane.

By the present invention, a fluorinated poly(phenylene ether ketone) is provided which is essentially optically transparent/colorless and has a lower dielectric constant than the commercial material PEEK ®. The material of the present invention is soluble in common organic solvents, unlike commercial poly(phenylene ether ether ketone), and can be solution cast or sprayed to produce thin films or coatings. The long term thermal stability of the fluorinated poly(phenylene ether ketone) of the present invention is superior to that of PEEK ®. These improvements in dielectric properties, optical transparency, solubility, processability, and thermal stability have been made without sacrificing other polymer properties.

DESCRIPTION OF THE PREFERRED EMBODIMENTS

The highly optically transparent, low dielectric fluorinated poly(phenylene ether ketone) according to the present invention is designated hereinafter as 12F-PEK. It is prepared according to the reaction route shown below:

The 12F-PEK polymer is produced by reacting the 6FBFP with the appropriate potassium salt of a bisphenol, the bisphenol AF shown in Equation I having been used in the specific example of the present invention. Polymerization of this fluorinated poly(phenylene ether ketone) was achieved by heating the 6FBFP with the potassium salt of bisphenol AF in a solvent to 165° C. to form a viscous, high molecular weight solution. The resulting 12F-PEK polymer, which was precipitated in water, had an inherent viscosity of 0.71 dl/g when measured at 35° C. in chloroform.

Films or coatings of the 12F-PEK polymer are prepared by spray-coating, painting, or spreading the polymer in a solvent onto glass or other substrate, and re-

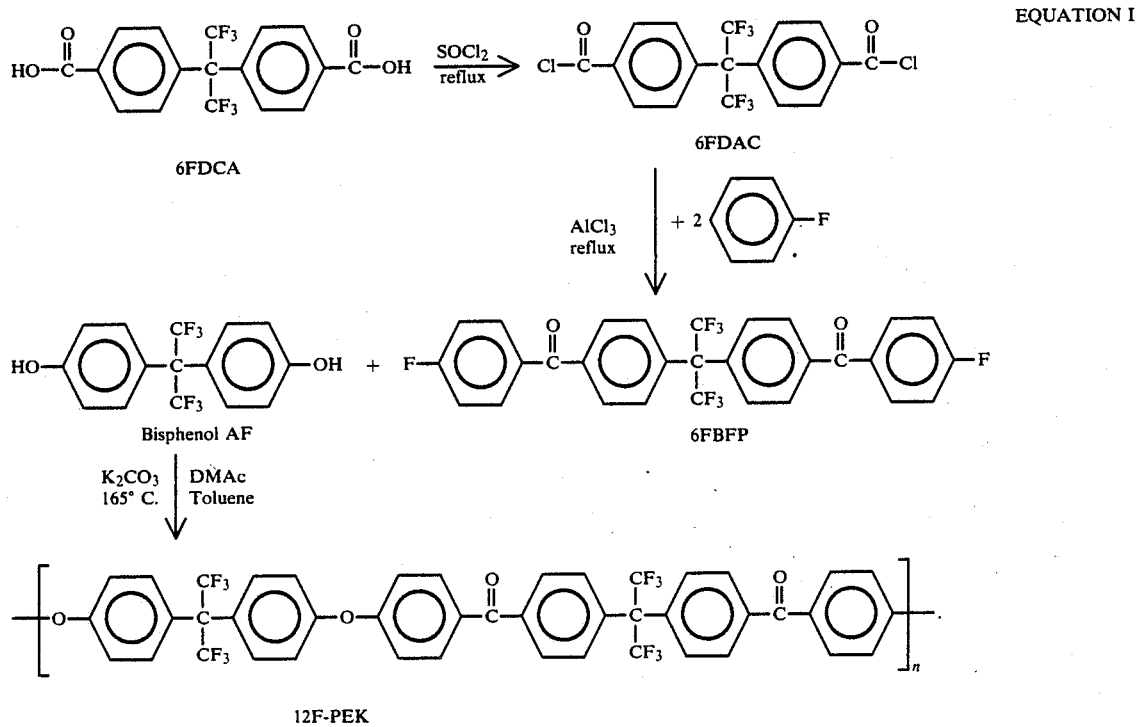

EQUATION I

The first step in preparing the 12F-PEK polymer of the present invention involves synthesis of the novel monomer 1,1,1,3,3,3-hexafluoro-2,2-bis[4-(4-fluorobenzoyl)phenyl]propane (designated 6FBFP in Reaction Equation I above). Preparation involves reaction of 1,1,1,3,3,3-hexafluoro-2,2-bis(p-carboxyphenyl)propane (6FDCA) with thionyl chloride to produce the monomer precursor 1,1,1,3,3,3-hexafluoro-2,2-bis(p-chloroformylphenyl)propane (6FDAC). The 6FDAC is then reacted with fluorobenzene in the presence of aluminum chloride to produce the 6FBFP monomer.

moving the solvent by either air drying or heating in a vacuum or forced air oven. Films and coatings that are optically transparent/colorless, flexible and tough are thus produced.

Although the bisphenol used in the specific example of the present invention was the bisphenol AF (structure shown in Equation I), any all-aromatic bisphenol compound could be reacted with the 6F-bis-fluorophenyl monomer 6FBFP to produce a fluorinated poly(phenylene ether ketone) as shown below in Reaction Equation II.

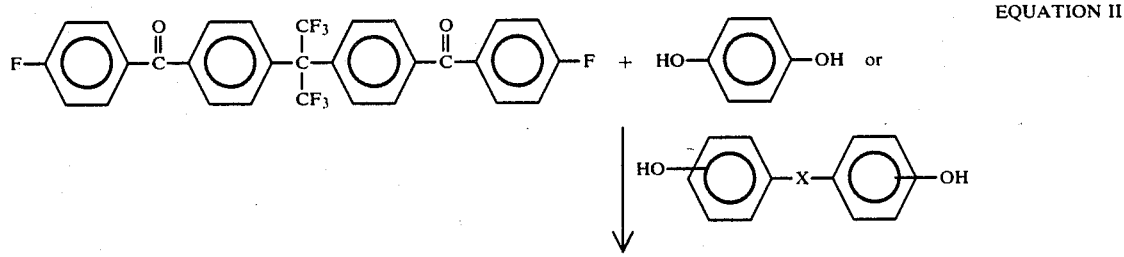

EQUATION II

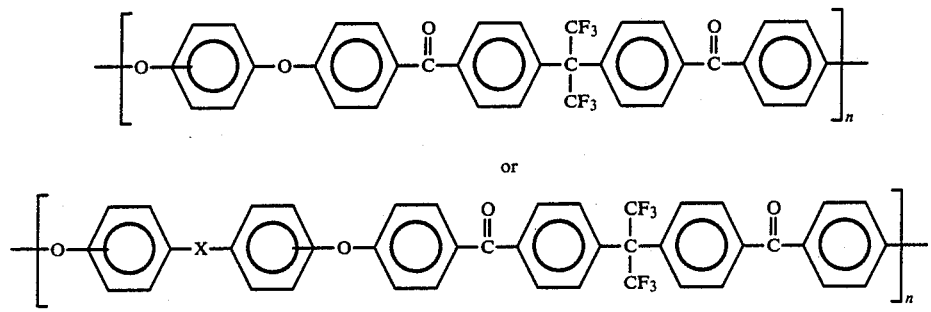

where X = aryl, SO$_2$, O, CO, —C(CH$_3$)$_2$, or S.

Although 6F-bis-fluorophenyl monomer (6FBFP, Equation I) was used in the specific examples to prepare the 12F-PEK polymer of the present invention, the 6F-bis-chlorophenyl monomer shown below

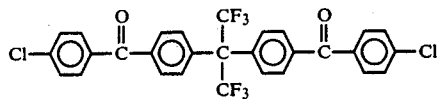

has also been used to produce 12F-PEK polymer. The 6FBFP, however, is preferable.

A comparison of properties of the fluorinated poly(phenylene ether ketone) 12F-PEK of the present invention with those of the commercially available poly(phenylene ether ether ketone) PEEK ® are shown in Table I below. The 12F-PEK has a higher glass transition temperature as determined by differential scanning calorimetry. The dielectric constant of the fluorinated polymer of the present invention is decidedly lower than that of the commercial material. Although the dynamic thermogravimetric analysis (TGA) data show the two polymers to have relatively the same behavior, upon isothermal aging in air at 350° C. the 12F-PEK showed superior long-term thermal stability. The 12F-PEK, as opposed to PEEK ®, can be dissolved in a solvent such as chloroform, methylene chloride, or methyl ethyl ketone, and applied as a film or coating to a desired substrate. It can also be solution cast to produce a self-supporting polymer film, as opposed to extruding which is the method used to produce commercial film from PEEK ®. The 12F-PEK polymer of the present invention is more colorless or optically transparent in the 400-500 nm range of the electromagnetic spectrum, as compared with the amber-colored commercial material PEEK ®.

TABLE I
PROPERTIES OF POLY(PHENYLENE ETHER KETONES)

| PROPERTY | 12F-PEK | PEEK ® |
|---|---|---|
| Glass Transition Temperature | 180° C. | 143° C. |
| Melt Temperature | (a) | 343° C. |
| Dielectric Constant at 10 GHz | 2.40 | 2.85 |
| Dynamic TGA, 10% wt. loss in air at | 537° C. | 540° C. |
| Isothermal TGA, % wt. loss | | |
| after 100 hours at 350° C. | 14% | 34% |
| 200 hours at 350° C. | 20% | 96% |
| Film Former (from Cast Solution) | Yes | No |
| Soluble Common Organic Solvents | Yes | No |
| Optically Transparent at 400-500 nm | Yes | No |

(a) Semi-crystalline structure from x-ray diffraction but no observable melt.

EXAMPLES

EXAMPLE I

Preparation of (6F-bis-fluorophenyl monomer

A 50 ml, round-bottom flask was charged with 1.18 g (3 mmol) of 1,1,1,3,3,3-hexafluoro-2,2-bis(p-carboxyphenyl)propane (designated above as 6FDCA) and thionyl chloride (5 ml, 69 mmol). The mixture was stirred at reflux for two hours, at which time the reaction mixture was clear and almost colorless. The reaction flask was allowed to cool, and unreacted thionyl chloride was removed by distillation. A vacuum pump was further used to remove any remaining thionyl chloride. The resulting residue, 1,1,1,3,3,3-hexafluoro-2,2-bis(p-chloroformylphenyl)propane (6FDAC), was a clear, beige viscous liquid (1.3 g, 100% yield), which formed white needle crystals from hexane and had a melting point of 96° C.-97° C.

In addition to the above preparation, 8 ml of fluorobenzene and 4 g (30 mmol) of aluminum chloride were placed in a 100 ml three-neck, round-bottom flask. The mixture was stirred and heated to reflux (85° C.) under argon gas. A solution of 6FDAC (5.51 g, 12.8 mmol) prepared as stated above in 6 ml of fluorobenzene was added dropwise to the reaction flask containing fluorobenzene/aluminum chloride over a 30 minute period. The reaction mixture was stirred an additional ten minutes and cooled to room temperature. The reaction mixture was slowly poured into 200 ml of rapidly stirring water. The reaction flask was rinsed with 3-50 ml portions of benzene and these washes were also poured into the water. After stirring for ten minutes, the organic layer was separated and washed with 200 ml of fresh water. The organic layer was again separated and dried over anhydrous magnesium sulfate. The dry organic layer was then decanted and concentrated to an oily residue. Isopropyl alcohol (30 ml) was added to the residue and stirred to yield white crystals of the desired product 1,1,1,3,3,3-hexafluoro-2,2,-bis[4-(4-fluorobenzoyl)phenyl]propane (6FBFP). Crystals of this polymer precursor were filtered and recrystallized from isopropyl alcohol to yield white plate needles (4.0 g, 56% yield) with a melting point of 142° C.-143° C. The structure of the 6FBFP (6F-bisfluorophenyl monomer) is:

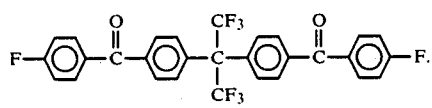

EXAMPLE II

Preparation of Fluorinated Poly(phenylene ether ketone) (12F-PEK)

A 100 ml, three-neck, round-bottom flask was charged with 0.6167 g (1.823 mmol) of bisphenol AF (the structure of bisphenol AF was shown previously in Equation I), 0.5040 g (3.65 mmol) potassium carbonate, 6 ml dimethylacetamide (DMAc) and 3 ml of toluene. The reaction flask was then fitted with a Dean-Stark trap which was filled with toluene and topped with a reflux condenser. The contents of the flask were heated under argon for one hour at reflux (120° C.). Water was azeotroped off with toluene as the potassium salt of bisphenol AF formed. When water evolution ceased, the Dean-Stark trap was drained, and the excess toluene in the reaction flask was allowed to distill until a temperature of 163° C. was obtained. The flask was then allowed to cool and the Dean-Stark trap was replaced with the reflux condenser. At this time, 1.0000 g (1.823 mmol) of 6F-bis-fluorophenyl monomer 6FBFP (structure shown and preparation described in Example I above) was added to the reaction flask in crystal form. The reaction mixture was heated to reflux at 160° C.-165° C. and stirred for 15 minutes, at which time the contents of the flask became noticeably viscous. The reaction mixture was diluted with 3 ml of DMAc and stirred at reflux for 45 minutes. The flask was allowed to cool and the contents were further diluted with 40 ml DMAc. The DMAc solution was solowly poured into 400 ml of rapidly stirred water to precipitate the polymer. This reaction precipitate was white and flaky and was allowed to stir for one and one-half hours in water.

The precipitate was collected by filtration and dissolved in 30 ml of chloroform. The chloroform solution was slowly dripped into rapidly stirring methanol (200 ml) to yield a stringy white precipitate. The mixture was filtered and the resulting precipitate was dried in vacuum at 80° C. for three hours to yield the fluorinated poly(phenylene ether ketone) 12F-PEK (as shown in Equation I). By the above preparation the yield was 1.17 g at 76%. The inherent viscosity of the 12F-PEK polymer was 0.71 dl/g, indicating a high molecular weight product. The polymer was soluble in common organic solvents.

EXAMPLE III

Preparation of Fluorinated Poly(phenylene ether ketone) 12F-PEK Films/Coatings The fluorinated poly(phenylene ether ketone) 12F-PEK polymer as prepared in Example II above was dissolved in a mixture of 70:30 methylene chloride/chloroform at a concentration of 10% solids by weight. Polymer films were prepared by casting the cold 12F-PEK polymer solution onto glass plates in an enclosed dust-free chamber at a relative humidity of 10%. Solutions were spread with a doctor blade, and blade gaps were set to ensure final film thicknesses of 1 mil and 0.5 mil. The films were dried overnight at room temperature and heated in a vacuum oven for one hour at 150° C.

Films were removed from glass substrates by immersing in a water bath. The resulting 12F-PEK polymer films were colorless/optically transparent, having ultraviolet transmission cut-offs in the range of 360 nm. The films were also flexible and had a glass transition temperature of 180° C.

The above examples are considered illustrative of the invention, and there may be modifications and variations therein that will be apparent to those skilled in the art without departing from the spirit and scope of the invention as defined in the hereto appended claims.

What is claimed is:

1. A fluorinated poly(phenylene ether ketone) having a structural formula selected from the group consisting of:

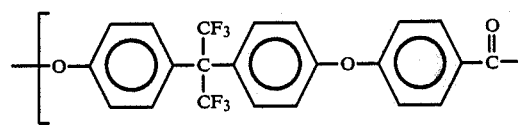

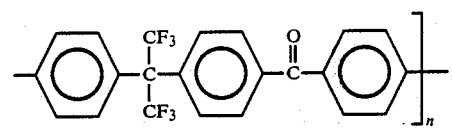

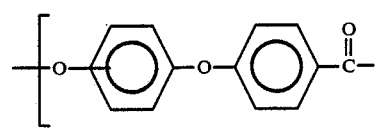

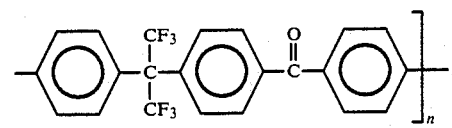

and

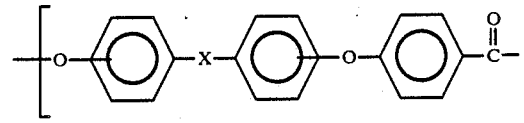

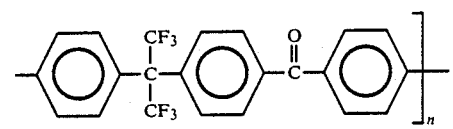

wherein X is selected from the group consisting of aryl, SO$_2$, O, CO, —C(CH$_3$)$_2$, and S.

2. A soluble, high temperature stable, highly optically transparent, low dielectric fluorinated poly(phenylene ether ketone) formed by the reaction in a solvent of bisphenol AF with 1,1,1,3,3,3-hexafluoro-2,2-bis[4-(4-halobenzoyl)phenyl]propane, wherein halo is selected from the group consisting of fluoro and chloro.

3. A soluble, high temperature stable, highly optically transparent, low dielectric, fluorinated poly(phenylene ether ketone) formed as the reaction product of 1,1,1,3,3,3-hexafluoro-2,2-bis[4-4-(halobenzoyl)phenyl]-propane, wherein halo is selected from the group consisting of fluoro and chloro, with a bisphenol selected from the group consisting of

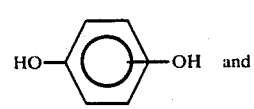 and

-continued

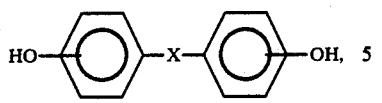

wherein X is selected from the group consisting of aryl, SO₂, O, CO, —C(CH₃)₂, and S.

4. A high temperature stable, highly optically transparent, low dielectric film or coating formed from the fluorinated poly(phenylene ether ketone) of claim 2.

5. A high temperature stable, highly optically transparent, low dielectric film or coating formed from the fluorinated poly(phenylene ether ketone) of claim 3.

6. The high temperature stable, highly optically transparent, low dielectric film or coating of claim 4, which is produced by dissolving the fluorinated poly(phenylene ether ketone) in a solvent and spreading or spraying the resulting solution on a substrate to form the film or coating.

7. The high temperature stable, highly optically transparent, low dielectric film or coating of claim 5, which is produced by dissolving the fluorinated poly(phenylene ether ketone) in a solvent and spreading or spraying the resulting solution on a substrate to form the film or coating.

8. A monomeric material having the following structural formula

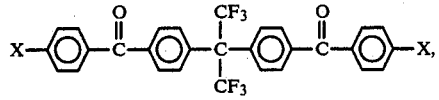

wherein X is selected from the group consisting of fluorine and chlorine.

9. 1,1,1,3,3,3-Hexafluoro-2,2-bis[4-(4-halobenzoyl)-phenyl]propane formed as the reaction product of 1,1,1,3,3,3-hexafluoro-2,2-bis(p-chloroformylphenyl)-propane and halobenzene, wherein halo is selected from the group consisting of fluoro and chloro.

* * * * *